Sept. 25, 1928.
A. W. PARKES
1,685,434
BEARING STRIP FOR MACHINE TOOL WAYS
Filed Sept. 4, 1925
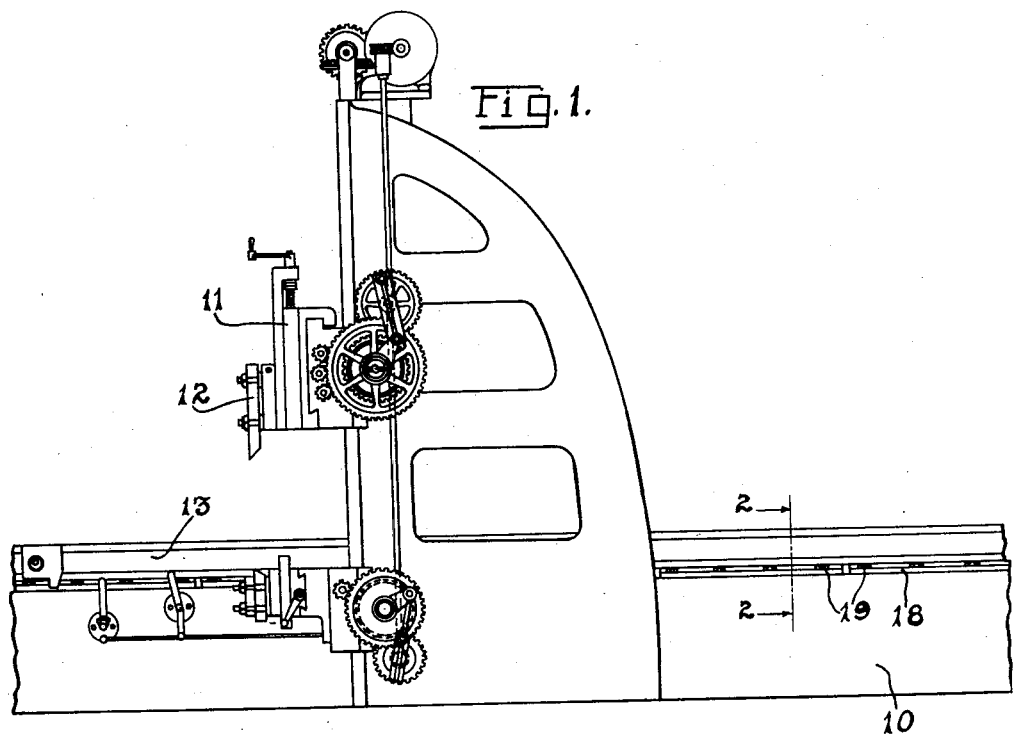
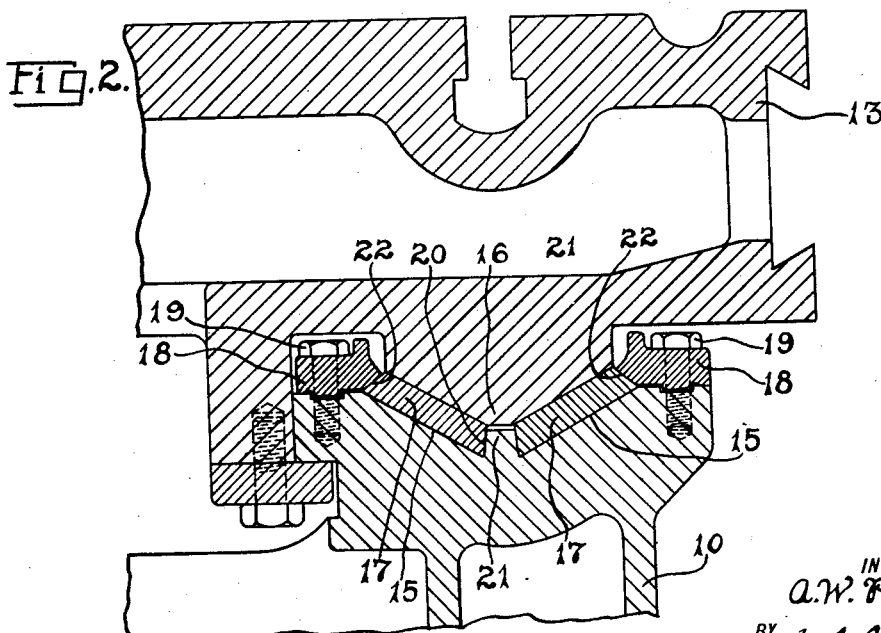
INVENTOR
A. W. Parkes
BY
Joseph M. Schofield
ATTORNEY Patented Sept. 25, 1928.

1,685,434

UNITED STATES PATENT OFFICE.

ALBERT WILLIAM PARKES, OF DUNDAS, ONTARIO, CANADA, ASSIGNOR TO NILES-BEMENT-POND COMPANY, OF NEW YORK, N. Y., A CORPORATION OF NEW JERSEY.

BEARING STRIP FOR MACHINE-TOOL WAYS.

Application filed September 4, 1925. Serial No. 54,450.

This invention relates to machine tools and in particular to an improved form of removable bearing strips for a reciprocating work table or other member.

It is an object of the present invention to provide bearing strips adapted to be rigidly clamped in position upon ways of a fixed member of the machine and adapted to support a movable member thereon.

It is another object of the invention to provide securing means for removable bearing strips which will enable them to be securely held in position, but quickly removed and others substituted therefor.

It is now the usual practice in machine tools to provide ways upon which slidable members may be supported. These are in the form of V's and made of and form a part of the material of the base, namely usually cast iron. These bearing surfaces, however, rapidly wear to the detriment of the life and precision of the machine tool. To maintain the ways up to a standard of precision, they are required to be frequently resurfaced by planing or scraping. It is therefore a special object of the invention to provide ways such as those for slidably supporting the reciprocating table of a planer with ways, the surfaces of which may be formed of a more desirable and durable material than cast iron and so designed that they may be readily removed for resurfacing or for substitution of other strips.

With these and other objects in view my invention consists in the features of construction and operation set forth in the following specification and illustrated in the accompanying drawing.

In the accompanying drawing annexed hereto and forming a part of this specification, I have shown my invention embodied in a metal planer but it will be understood that the invention can be otherwise embodied and that the drawing is not to be construed as defining or limiting the scope of the invention, the claims appended to this specification being relied upon for that purpose.

In the drawing:

Figure 1 is a side elevation of a planer, the table of which is slidably mounted upon a base, and Fig. 2 is a fragmentary sectional view taken upon line 2—2 of Fig. 1.

In the above mentioned drawing, I have shown but one embodiment of the invention which is now deemed preferable, but it is to be understood that changes and modifications may be made within the scope of the appended claims without departing from the spirit of the invention.

Briefly, and in its broadest aspect, my invention comprises a machine tool having: first, a base; second, a table slidably mounted thereon; third, ways usually of V form on the base adapted to engage corresponding surfaces on the table; fourth, bearing strips of slightly wedge form adapted to be mounted on the base so that their upper or free surfaces may engage the slidable member; and fifth, clamping strips adapted to retain the bearing strips in fixed position.

Referring more in detail to the figures of the drawing, I show a conventional form of machine tool, namely a planer having a base 10 and tool head 11 adjustably mounted and adapted to carry one or more cutting tools 12. A table 13 is slidably mounted upon the base 10. The base 10, on opposite sides, is provided with V ways 15 adapted to engage projections 16 on opposite sides of the table 13. As shown in Fig. 2, the V shaped ways 15 of the base 10 are provided with bearing strips 17. These strips 17, as shown, are grouped in pairs, each forming one side of the ways 15 and adapted to engage one side of the projection 16 on the table 13. These are adapted to be securely held in position by clamping strips 18 adapted to engage the opposite end faces of the strips 17 to hold them in position. Bolts or screws 19 passing through clamping strips 18 enable these clamping strips 18 to force the bearing strips toward their operative position and hold them securely therein.

As shown in Fig. 2, the bearing strips 17 are slightly wedge shaped, the lower surface of which is slightly wider than the upper surface. The contiguous bevelled end faces 20 of these bearing strips 17 contact with an integral projection 21 formed in the base 10 and extending partly into the V ways. Similarly the outer end faces 22 are angularly disposed or bevelled so that when the clamping strips 17 are forced downward, they are forced toward the central projection 21 in the base 10 and held rigidly toward the oblique surfaces of the ways 15 on the base 10.

What I claim is:

1. A machine tool comprising in combination, a base, a reciprocatory table thereon, ways on the base for said table, a bearing strip for said table on said ways, an integral projection on said base forming an abutment for one edge of said bearing strip, and a clamping strip engaging the opposite edge of said bearing strip for retaining it rigidly in position.

2. A machine tool comprising in combination, a base, a reciprocatory table thereon, ways on the base for said table, a bearing strip for said table on said ways, said bearing strip being dovetailed along one longitudinal edge and contacting against a portion of said base, and a clamping strip engaging the opposite longitudinal edge of said bearing strip for retaining it in position.

3. A machine tool comprising in combination, a base, a reciprocatory table thereon, V shaped ways on the base for said table, a pair of dovetailed bearing strips for each of said ways, an integral projection on said base forming an abutment for the contiguous longitudinal edges of said strips, and clamping strips engaging the outer edges of said strips for retaining them rigidly in position.

4. A machine tool comprising in combination, a base, a reciprocatory table thereon, V shaped ways on the base for said table, a central integral projection formed in said ways, a pair of dovetailed bearing strips for said table on each of said ways, the inner longitudinal edges of said strips engaging said projection, and clamping strips engaging the outer longitudinal edges of said strips for retaining them in position.

In testimony whereof, I hereto affix my signature.

ALBERT WILLIAM PARKES.